US006423335B1

(12) United States Patent
Mawatari et al.

(10) Patent No.: US 6,423,335 B1
(45) Date of Patent: Jul. 23, 2002

(54) MODIFIED MILK POWDER COMPOSITION

(75) Inventors: Kazunori Mawatari; Susumu Shibahara; Takeo Ueda, all of Kanagawa; Makoto Takeuchi; Kazuhiro Shimotori, both of Tokyo, all of (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/704,602

(22) Filed: Nov. 3, 2000

(30) Foreign Application Priority Data

Nov. 4, 1999 (JP) .............................. 11-313746

(51) Int. Cl.[7] .......................... A61K 47/00; A61K 9/00; A01N 61/00; A01N 43/04
(52) U.S. Cl. ........................... 424/439; 424/400; 514/1; 514/2; 514/23; 514/53; 514/54
(58) Field of Search ................. 424/400, 439; 514/1, 2, 23, 53, 54

(56) References Cited

U.S. PATENT DOCUMENTS 5,492,899 A * 2/1996 Masor et al. ................. 514/47
6,190,724 B1 * 2/2001 Sawatzki et al. ........... 426/656

FOREIGN PATENT DOCUMENTS

| EP | 0 418 593 | 3/1991 |
| EP | 0 540 462 | 5/1993 |
| EP | 0 665 012 | 8/1995 |

OTHER PUBLICATIONS

H. Boehles, et al., Zeitschrift fuer Ernaehrungswissenschaft, vol. 37, No. 2, pp. 132–146, "Reflections About Possible Nutritional Supplements in Infant Milk Formula," 1998.

J. C. Roig, et al., The Journal of Nutrition, vol. 126, No. 4s, pp. 1115s–1120s, "Enteral Glutamine Supplementation for the Very Low Birthweight Infant: Plasma Amino Acid Concetrations," 1996.

* cited by examiner

Primary Examiner—Thurman K. Page
Assistant Examiner—Charesse Evans
(74) Attorney, Agent, or Firm—Oblon, Spivak, McClelland, Maier & Neustadt, P.C.

(57) ABSTRACT

A composition comprising modified milk powder, and glutamine and/or a peptide containing glutamine.

11 Claims, No Drawings

MODIFIED MILK POWDER COMPOSITION

BACKGROUND OF THE INVENTION

1. Field of the Invention

The present invention relates to a modified milk powder formula for babies of newly born to nine months old, and modified milk powder for infants of nine months old to three years old.

2. Brief Description of the Background Art

Modified milk powder is ingested as a substitute of mother's milk by many neonates, babies, and infants, and has been widely used as an excellent nourishing means in many countries. On the other hand, since a renal function is not thoroughly reached maturity especially in babies and infants, it is difficult to increase a protein level in a meal, and limitation of proteins is carried out. Therefore, in spite of the intrinsically most remarkable growing period, it is impossible to increase proteins in a meal, which are most important for growth, so that it is difficult to promote further growth of babies and infants with mere commercial modified milk powder.

Furthermore, it is known that babies and infants lose little by little an immune antibody (IgG) received from their mother and their resistance to infection gradually decreases at the time exceeding six months after their birth. From this point of view, it is also desirable to actively supplement sufficient nutrition, particularly proteins which positively act on immunity, but the supplementation is difficult from the reason mentioned above, too.

Therefore, at some of commercial modified milk powder, an attempt has been made to add an immunity-activating peptide from the components of cow milk. In case of babies and infants, however, it is desirable to activate own immune system of living body by modifying the ingredients of a meal, but regrettably there is almost no such example.

On the other hand, glutamine is known as a nutrition component necessary for restoring gastric or intestinal mucous membranes, and is used as an ingredient of drugs for gastrointestinal diseases. However, there is no information indicating that glutamine may improve nutrition of babies and infants and also activate the immune system.

SUMMARY OF THE INVENTION

An object of the present invention is to improve nutritional effects of modified milk powder and activate immunity of neonates, babies and infants, which is prone to decrease, by focusing on effective utilization of dietary proteins difficult at conventional modified milk powder.

The present invention relates to a composition comprising modified milk powder, and glutamine and/or a peptide containing glutamine.

Also, the present invention relates to a method for improving nutritional effect of modified milk powder, comprising administering to a human or animal an effective amount of a composition comprising modified milk powder, and glutamine and/or a peptide containing glutamine.

DETAILED DESCRIPTION OF THE INVENTION

As a result of extensive studies for achieving the above and other objects, the present inventors have found that addition of crystalline glutamine, a principal amino acid in intracellular fluid, to modified milk powder promotes the growth and activates the immunological competence without increasing an urea nitrogen level in blood which is an index of overabundance of dietary proteins.

The composition comprising modified milk powder, and glutamine and/or a peptide containing glutamine of the present invention (hereinafter referred to as the composition of the present invention) has more excellent growth promoting effect and immunity-activating effect than conventional modified milk powder, i.e., modified milk powder which contains neither glutamine nor peptide containing glutamine.

Glutamine used in the present invention is different from protein glutamine contained in modified milk powder, and is glutamine which exists as a free amino acid. Both D-form and L-form may be used as such glutamine; however, L-form is preferred.

Glutamine can be made by chemical synthesis or fermentation for the composition of the present invention, irrespective of the source. However, a single substance of a high purity is preferred. For example, it is preferred to use glutamine having a purity higher than that prescribed in *Japanese Standards of Food Additives*.

The peptide containing glutamine for use in the present invention is preferably a peptide containing L-glutamine in an amount of 20% or more of the number of the total amino acid residues contained in the peptide. The peptide may be a peptide made by chemical synthesis or peptide components obtained by hydrolysis of animal or plant proteins. In addition, from the viewpoint of digestion and assimilation, the peptide has preferably a molecular weight of 2000 or less, and particularly preferably 1000 or less. The shortest peptide which can be used is a dipeptide. The peptide is preferably a peptide which can release glutamine in a living body after the administration. Other amino acids constituting the peptide are not particularly limited.

The composition of the present invention can be manufactured, for example, by adding the above glutamine and/or peptide containing glutamine to conventional modified milk powder. Alternatively, the composition of the present invention may be manufactured by designing modified milk powder for babies and infants containing new components, and then adding glutamine and/or peptide containing glutamine thereto. The mixing rate of glutamine and/or a peptide containing glutamine is preferably 5 to 170% by weight, particularly 5 to 33% by weight, calculated as glutamine, based on protein weight in the modified milk powder.

With regard to methods for mixing glutamine, a rocking mixer, a full-corn blender and the like may be mentioned but general techniques for powder mixing can be used. Furthermore, it is possible to enhance the solubility for facilitating preparation at use by spay-drying the resulting mixture.

The composition of the present invention can contain a carrier. Specifically, glutamine or a peptide containing glutamine may be mixed into, other than modified milk powder, other components as nutrition supplementary foods for adding to modified milk powder, such as any of a protein, a peptide, a fat, a carbohydrate, a vitamin, and a mineral, or a mixture thereof. At that time, it is possible to combine the above with an excipient, a taste-adjusting agent, a dye or pigment, and the like.

Among the above components, it should be avoided to mix more amount of a protein or a peptide than necessary, in consideration of load on kidneys of neonates, babies and infants.

The composition of the present invention thus manufactured may be distributed as it is, like commercial modified milk powder, i.e., in form of a powdery mixture.

In addition, the composition of the present invention may be administered via general administration routes such as oral administration, intestinal administration, and intravenous administration, and it may be distributed with changing into more proper form in accordance with the administration route. Examples of the form include tablets, granules, fine particles, solutions, and the like.

The composition of the present invention can be diluted by a diluent. Examples of the diluent include water, physiological saline, juice, and the like.

The composition of the present invention can be administered to a human or animal, and the age of the human or animal is not particularly limited. However, it is preferably administered to a baby or infant, particularly a human baby or infant of 3 years or less.

The dose and frequency of the administration vary depending on age, nutritional conditions, and the like, but for example, in human, after the composition of the present invention is diluted with a diluent such as water at an appropriate concentration according to the prepared milk powder, it is administered at an amount of several decades milliliters to several liters, preferably several hundreds milliliter to several liters, in terms of the diluted solution of the composition, once to several times per day.

According to the present invention, saving of proteins in modified milk powder is effected and, as a result, effects equal to or higher than those obtainable by adding a larger amount of proteins to modified milk powder can be attained without accompanying increase of proteins in modified milk powder which is hitherto difficult and by adding glutamine and/or a peptide containing glutamine to modified milk powder. Accordingly, it becomes possible to improve remarkably nutritional effects of milk powder for babies and infants, while the nutritional effects of the conventional milk powder is reaching almost its limit.

Moreover, the composition of the present invention possesses a more excellent growth promoting effect and immunity-activating effect than conventional modified milk powder, i.e., modified milk powder which contains neither glutamine nor a peptide containing glutamine.

The present invention will be further explained with reference to Examples. However, the present invention is not limited thereto.

EXAMPLE 1

Four-week-age male rats (the Donryu strain) were fed 20% protein diet for one week. Then, glutamine (Gln) and glutamic acid (Glu) each were mixed into 3% protein diet at the level of 5% (w/w) and offered to the rats for three weeks. Also, a 20% protein diet group and a 3% protein diet group were set as controls. Upon each rat, body weight, weight of tissues, blood urea nitrogen (BUN), the level of leukocytes, the level of erythrocytes, hematocrit, the level of platelets, and production of TNF-α by peritoneal macrophage as an index of immune response were determined.

Table 1 shows the component of each experimental diet, Table 2 shows results of the increase of body weight, weight of tissues and BUN, and blood profile, and Table 3 shows results of the index of immune response of each experimental group.

TABLE 1

|  | Control group (20% protein) | Control group (3% protein) | Gln group | Glu group |
| --- | --- | --- | --- | --- |
| Amino acids | 0% | 0% | 5% | 5% |
| Gln (ratio to proteins) | 0% (0%) | 0% (0%) | 5% (167%) | 0% (0%) |
| Glu (ratio to proteins) | 0% (0%) | 0% (0%) | 0% (0%) | 5% (167%) |
| Proteins | 20% | 3% | 3% | 3% |
| Fats | 5% | 5% | 5% | 5% |
| Carbohydrates | 68.3% | 85.3% | 80.3% | 80.3% |
| Vitamin mixture | 1% | 1% | 1% | 1% |
| Choline chloride | 0.2% | 0.2% | 0.2% | 0.2% |
| Mineral mixture | 3.5% | 3.5% | 3.5% | 3.5% |
| Filter paper powder | 2% | 2% | 2% | 2% |

TABLE 2

|  | Control group (20% protein) | Control group (3% protein) | Gln group | Glu group |
| --- | --- | --- | --- | --- |
| Initial body weight | 167.4 ± 3.4 | 160.7 ± 2.8 | 167.2 ± 2.9 | 167.5 ± 3.1 |
| Body weight at the end of experiment | 280.1 ± 5.6 | 190.5 ± 4.6 | 200.2 ± 3.1 | 180.5 ± 3.8 |
| Lever weight (g/100 g/ body weight) | 4.3 ± 0.2 | 3.6 ± 0.1 | 3.8 ± 0.1 | 3.8 ± 0.2 |
| Spleen weight (mg/100 g body weight) | 222.0 ± 8.3 | 179.9 ± 9.5 | 175.6 ± 8.6 | 179.7 ± 8.0 |
| Blood urea nitrogen (mg/dl) | 22.0 ± 3.8 | 18.3 ± 2.5 | 18.9 ± 2.1 | 18.8 ± 2.9 |

TABLE 3

| Component | Control group (20% protein) | Control group (3% protein) | Gln group | Glu group |
| --- | --- | --- | --- | --- |
| Leukocytes ($\times 10^2/\mu l$) | 89.8 ± 5.8 | 59.4 ± 6.6 | 54.8 ± 2.1 | 57.0 ± 5.2 |
| Erythrocytes ($\times 10^2/\mu l$) | 809 ± 12 | 769 ± 24 | 797 ± 10 | 774 ± 7 |
| Hematocrit | 48 ± 1 | 46 ± 1 | 46 ± 0.1 | 45 ± 1 |
| Platelets ($\times 10^4/\mu l$) | 79 ± 7 | 60 ± 2 | 72 ± 2 | 64 ± 3 |
| Production of TNF-α by peritoneal macrophage (pg/ml) | 79.1 ± 3.4 | 10.6 ± 2.9 | 2.01 ± 2.5 | 9.8 ± 2.9 |

As a result, feeding of the low protein diet resulted in remarkable decrease of body weight in the 3% protein diet group, but this phenomenon was observed in the Gln diet group and feed efficiency and efficiency of protein utilization of feed are higher than those in the 3% protein diet group. However, this beneficial phenomenon was not observed in the Glu diet group. Furthermore, the production of TNF-α by peritoneal macrophage, i.e., an index of immune response showed a similar tendency that remarkable suppression was observed in the 3% protein diet group, and improvement was observed in the Gln diet group but no improvement in the Glu diet group. Similarly, the level of platelets regarded as important at immune function shows that remarkable suppression was observed in the 3% protein diet group, and improvement was observed in the Gln diet group but no improvement in the Glu diet group. From the above, Gln improves a nutritional state under limited dietary proteins and also promotes normalization of immunological competence.

EXAMPLE 2

Four-week-age male rats (the Donryu strain) were fed 20% protein diet as shown in Table 1 for one week. Then, using commercial modified milk powder (milk serum protein, soybean oil, lactose, and various vitamins and minerals were mixed; level of proteins was from 12 to 13% by weight) as a control, glutamine (Gln) was mixed into the commercial modified milk powder at the level of 0.3, 0.65, 1, or 5% (ratio of glutamine to proteins became 2, 5, 8, or 40%), and each diet was offered (free ingestion) for two weeks. Upon each rat, body weight, weight of tissues, blood urea nitrogen (BUN), the level of leukocytes, the level of erythrocytes, hematocrit, the level of platelets, and production of TNF-α by peritoneal macrophage as an index of immune response were measured.

Table 4 shows the composition of each experimental diet, Table 5 shows results of the increase of body weight, weight of tissues and BUN, and Table 6 shows results of the blood profile and index of immune response of each experimental group.

TABLE 4

|  | Control group | 0.3% Gln group | 0.65% Gln group | 1% Gln group | 5% Gln group |
| --- | --- | --- | --- | --- | --- |
| Gln (Ratio to protein) | 0% (0%) | 0.3% (2.3%) | 0.65% (5%) | 1% (7.7%) | 5% (38.5%) |
| Protein | 13% | 13% | 13% | 13% | 13% |
| Fats | 28% | 28% | 28% | 28% | 28% |
| Carbohydrates | 52.3% | 52% | 51.7% | 51.3 | 47.3% |
| Vitamin mixture | 1% | 1% | 1% | 1% | 1% |
| Choline chloride | 0.2% | 0.2% | 0.2 | 0.2% | 0.2 |
| Mineral mixture | 3.5% | 3.5% | 3.5% | 3.5% | 3.5% |
| Filter paper powder | 2% | 2% | 2% | 2% | 2% |

TABLE 5

|  | Control group | 0.3% Gln group | 0.65% Gln group | 1% Gln group | 5% Gln group |
| --- | --- | --- | --- | --- | --- |
| Initial body weight | 163.7 ± 2.8 | 163.9 ± 2.7 | 164.0 ± 2.6 | 164.1 ± 2.8 | 164.2 ± 2.5 |
| Body weight at the end of experiment | 230.1 ± 5.2 | 233.1 ± 6.5 | 238.2 ± 4.8 | 241.7 ± 5.1 | 245.8 ± 7.5 |
| Lever weight (g/100 g body weight) | 4.6 ± 0.3 | 4.7 ± 0.5 | 4.8 ± 0.4 | 4.9 ± 0.3 | 5.1 ± 0.5 |
| Spleen weight (mg/100 g body weight) | 241.0 ± 6.5 | 243.0 ± 5.1 | 243.0 ± 7.2 | 245.0 ± 6.1 | 243.0 ± 5.8 |
| Blood urea nitrogen (mg/dl) | 20.1 ± 2.4 | 20.5 ± 1.8 | 22.1 ± 2.7 | 23.4 ± 3.1 | 24.1 ± 3.5 |

TABLE 6

|  | Control group | 0.3% Gln group | 0.65% Gln group | 1% Gln group | 5% Gln group |
| --- | --- | --- | --- | --- | --- |
| Leukocytes ($\times 10^2/\mu l$) | 80.4 ± 4.5 | 82.8 ± 5.8 | 83.3 ± 5.2 | 81.8 ± 4.9 | 82.3 ± 5.1 |
| Erythrocytes ($\times 10^2/\mu l$) | 812 ± 21 | 815 ± 19 | 815 ± 23 | 824 ± 15 | 830 ± 12 |
| Hematocrit | 47 ± 1 | 48 ± 1 | 49 ± 1 | 48 ± 1 | 49 ± 1 |
| Platelets ($\times 10^4/\mu l$) | 78 ± 5 | 79 ± 7 | 81 ± 8 | 83 ± 7 | 85 ± 5 |
| Production of TNF-α by peritoneal macrophage (pg/ml) | 159.1 ± 23.9 | 148.1 ± 33.4 | 180.7 ± 15.4 | 189.2 ± 23.7 | 223.7 ± 33.4 |

As a result, no difference in body weight and any of the other indexes between the 0.3% Gln group and the control group (Gln 0%) was observed, but a slight difference in body weight was observed at the 0.65% Gln group and the production of TNF-α by peritoneal macrophage was higher than that at the control group. Furthermore, at the 1.5% Gln group, similar to the Gln group in Example 1, there were observed differences in the body weight, the level of platelets, and the production of TNF-α by peritoneal macrophage, as compared with the control group. Accordingly, it was confirmed that addition of Gln to modified milk powder for child-rearing further enhances the nutritional effects, promotes growth of experimental animals, and enhances the immunological competence.

This application is based on Japanese applications No. Hei 11-313746 filed on Nov. 4, 1999, the entire content of which is incorporated hereinto by reference.

While the invention has been described in detail and with reference to specific embodiments thereof, it will be apparent to one of skill in the art that various changes and modifications can be made therein without departing from the spirit and scope thereof.

What is claimed is:

1. A composition comprising modified milk powder, and glutamine and/or a peptide containing glutamine, wherein the glutamine and/or a peptide containing glutamine is contained at an amount of from 5 to 170% by weight calculated as glutamine based on protein weight in the modified milk powder, and wherein the peptide containing glutamine has a molecular weight of 2000 or less and contains glutamine in an amount of 20% or more of the total amino acid residues in the peptide.

2. The composition according to claim 1, wherein the glutamine and/or a peptide containing glutamine is contained at an amount of from 5 to 170% by weight calculated as glutamine based on protein weight in the modified milk powder.

3. The composition according to claim 1, wherein the peptide containing glutamine has a molecular weight of 2000 or less.

4. The composition according to claim 1, wherein the modified milk powder is modified milk powder for babies or infants.

5. The composition according to claim 1, further comprising a diluent or carrier.

6. A method for improving nutritional effect of modified milk powder, comprising administering to a human or animal an effective amount of a composition comprising modified milk powder, and glutamine and/or a peptide containing glutamine, wherein the glutamine and/or a peptide containing glutamine is contained at an amount of from 5 to 170% by weight calculated as glutamine based on protein weight in the modified milk powder, and wherein the peptide containing glutamine has a molecular weight of 2000 or less and contains glutamine in an amount of 20% or more of the total amino acid residues in the peptide.

7. The method according to claim 6, wherein the glutamine and/or a peptide containing glutamine is contained at an amount of from 5 to 170% by weight calculated as glutamine based on protein weight in the modified milk powder.

8. The method according to claim 6, wherein the peptide containing glutamine has a molecular weight of 2000 or less.

9. The method according to claim 6, wherein the modified milk powder is modified milk powder for babies or infants.

10. The method according to claim 6, wherein the composition further comprises a diluent or carrier.

11. The method according to claim 6, wherein the composition is administered to a human baby or infant.

* * * * *

UNITED STATES PATENT AND TRADEMARK OFFICE
CERTIFICATE OF CORRECTION

PATENT NO.    : 6,423,335 B1
DATED         : July 23, 2002
INVENTOR(S)   : Mawatari et al.

It is certified that error appears in the above-identified patent and that said Letters Patent is hereby corrected as shown below:

<u>Column 6,</u>
Lines 40-53, delete Claims 2 and 3 in their entirety.

<u>Column 7,</u>
Lines 6-10, delete Claim 7, in its entirety.

<u>Column 8,</u>
Lines 1 and 2, delete Claim 8, in its entirety.

Signed and Sealed this

Fifth Day of August, 2003

JAMES E. ROGAN
*Director of the United States Patent and Trademark Office*